United States Patent
Womack et al.

(10) Patent No.: US 9,155,045 B2
(45) Date of Patent: *Oct. 6, 2015

(54) SYSTEM AND METHOD FOR UPLINK TIMING SYNCHRONIZATION IN CONJUNCTION WITH DISCONTINUOUS RECEPTION

(71) Applicant: BlackBerry Limited, Waterloo (CA)

(72) Inventors: James Earl Womack, Bedford, TX (US); Zhijun Cai, Herndon, VA (US); Yi Yu, Reston, VA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/522,277

(22) Filed: Oct. 23, 2014

(65) Prior Publication Data

US 2015/0043412 A1 Feb. 12, 2015

Related U.S. Application Data

(63) Continuation of application No. 14/086,302, filed on Nov. 21, 2013, now Pat. No. 8,902,846, which is a continuation of application No. 13/244,805, filed on Sep. 26, 2011, now Pat. No. 8,594,035, which is a continuation of application No. 12/865,652, filed as application No. PCT/US2009/032591 on Jan. 30, 2009, now Pat. No. 8,634,361.

(60) Provisional application No. 61/025,485, filed on Feb. 1, 2008.

(51) Int. Cl.
H04W 72/04 (2009.01)
H04W 52/02 (2009.01)
H04W 56/00 (2009.01)
H04L 5/00 (2006.01)
H04W 88/02 (2009.01)

(52) U.S. Cl.
CPC ......... *H04W 52/0216* (2013.01); *H04L 5/0048* (2013.01); *H04W 52/0209* (2013.01); *H04W 56/0005* (2013.01); *H04W 72/0413* (2013.01); *H04W 88/02* (2013.01)

(58) Field of Classification Search
None
See application file for complete search history.

(56) References Cited

U.S. PATENT DOCUMENTS 7,496,048 B2   2/2009   Ikeda et al.
7,724,697 B2   5/2010   Dalsgaard et al.
7,844,265 B2   11/2010  Kuchibhotla et al.

(Continued)

FOREIGN PATENT DOCUMENTS

EP   1601224   11/2005
EP   1916859   4/2008

(Continued)

OTHER PUBLICATIONS

Extended European Search Report issued in European Application No. 14167577.7 on Oct. 29, 2014; 4 pages.

(Continued)

*Primary Examiner* — Hassan Phillips
*Assistant Examiner* — Gautam Sharma
(74) *Attorney, Agent, or Firm* — Fish & Richardson P.C.

(57) ABSTRACT

A system and method are disclosed for providing uplink timing synchronization during DRX operation in a wireless communication system.

36 Claims, 9 Drawing Sheets

(56) References Cited

U.S. PATENT DOCUMENTS

| | | |
|---|---|---|
| 7,957,360 B2 | 6/2011 | Suzuki et al. |
| 8,112,075 B2 | 2/2012 | Pedersen |
| 8,179,828 B2 | 5/2012 | Cai et al. |
| 8,199,725 B2 | 6/2012 | Yu et al. |
| 8,249,004 B2 | 8/2012 | Wang et al. |
| 2004/0063430 A1 | 4/2004 | Cave et al. |
| 2007/0133479 A1 | 6/2007 | Montojo et al. |
| 2007/0149993 A1 | 6/2007 | Kasahara et al. |
| 2007/0177569 A1 | 8/2007 | Lundby |
| 2007/0235446 A1 | 10/2007 | Cao et al. |
| 2007/0254598 A1 | 11/2007 | Bachl et al. |
| 2007/0254656 A1 | 11/2007 | Dalsgaard et al. |
| 2007/0260956 A1 | 11/2007 | Terry et al. |
| 2007/0287468 A1 | 12/2007 | Jeong et al. |
| 2007/0291728 A1 | 12/2007 | Dalsgaard et al. |
| 2007/0293233 A1 | 12/2007 | Inoue et al. |
| 2008/0008510 A1 | 1/2008 | Lee et al. |
| 2008/0026744 A1 | 1/2008 | Frederiksen et al. |
| 2008/0075036 A1 | 3/2008 | Bertrand et al. |
| 2008/0101268 A1 | 5/2008 | Sammour et al. |
| 2008/0101280 A1 | 5/2008 | Gholmieh et al. |
| 2008/0117873 A1 | 5/2008 | Ranta-Aho et al. |
| 2008/0165698 A1 | 7/2008 | Dalsgaard et al. |
| 2008/0186892 A1 | 8/2008 | Damnjanovic |
| 2008/0200203 A1 | 8/2008 | Malladi et al. |
| 2008/0268785 A1 | 10/2008 | McCoy et al. |
| 2008/0268863 A1 | 10/2008 | Pedersen et al. |
| 2008/0305745 A1 | 12/2008 | Zhang et al. |
| 2008/0310396 A1 | 12/2008 | Park et al. |
| 2008/0311919 A1 | 12/2008 | Whinnett et al. |
| 2008/0316950 A1 | 12/2008 | Damnjanovic |
| 2009/0011718 A1 | 1/2009 | Chun et al. |
| 2009/0034468 A1 | 2/2009 | Muharemovic et al. |
| 2009/0046570 A1 | 2/2009 | Sarkar et al. |
| 2009/0046674 A1 | 2/2009 | Gao et al. |
| 2009/0052367 A1 | 2/2009 | Cai et al. |
| 2009/0082072 A1 | 3/2009 | Ulupinar et al. |
| 2009/0103500 A1 | 4/2009 | Malkamaki et al. |
| 2009/0163199 A1 | 6/2009 | Kazmi et al. |
| 2009/0168731 A1 | 7/2009 | Zhang et al. |
| 2009/0180414 A1* | 7/2009 | Maeda et al. ............... 370/311 |
| 2009/0196366 A1 | 8/2009 | Shen et al. |
| 2009/0232118 A1 | 9/2009 | Wang et al. |
| 2009/0239525 A1 | 9/2009 | Cai et al. |
| 2009/0239566 A1 | 9/2009 | Pelletier et al. |
| 2009/0239568 A1 | 9/2009 | Bertrand et al. |
| 2009/0318177 A1 | 12/2009 | Wang et al. |
| 2010/0195501 A1 | 8/2010 | Tynderfeldt et al. |
| 2010/0232382 A1 | 9/2010 | Gauvreau et al. |
| 2010/0284326 A1 | 11/2010 | Oh |
| 2011/0019637 A1 | 1/2011 | Ojala et al. |
| 2011/0035639 A1 | 2/2011 | Earnshaw et al. |
| 2012/0220328 A1 | 8/2012 | Yu et al. |
| 2014/0162673 A1 | 6/2014 | Yu et al. |

FOREIGN PATENT DOCUMENTS

| | | |
|---|---|---|
| JP | 2007-235446 | 9/2007 |
| JP | 2008-061253 | 3/2008 |
| JP | 2009-531973 | 9/2009 |
| KR | 10-2007-0101175 | 10/2007 |
| KR | 10-2007-0104175 | 10/2007 |
| TW | 200803252 | 1/2008 |
| WO | 2006/130866 | 12/2006 |
| WO | 2007/013457 | 2/2007 |
| WO | 2007/051192 | 5/2007 |
| WO | 2007/073118 | 6/2007 |
| WO | 2007/078171 | 7/2007 |
| WO | 2007/102689 | 9/2007 |
| WO | 2007/111941 | 10/2007 |
| WO | 2007/145006 | 12/2007 |
| WO | 2007/148458 | 12/2007 |
| WO | 2007/149993 | 12/2007 |

OTHER PUBLICATIONS

"3GPP TS 36.213 V8.1.0—3rd Generation Partnership Project; Technical Specification Group Radio Access Network; Evolved Universal Terrestrial Radio Access (E-UTRA); Physical Layer Procedures (Release 8)"; 3GPP Organizational Partners; Nov. 2007; 17 pages.

"3GPP TS 36.213 V8.2.0—3rd Generation Partnership Project; Technical Specification Group Radio Access Network; Evolved Universal Terrestrial Radio Access (E-UTRA); Physical Layer Procedures (Release 8)"; 3GPP Organizational Partners; Mar. 2008; 30 pages.

"3GPP TS 36.300 V8.3.0—3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; Release 8"; 3GPP Organizational Partners; Dec. 2007; Part 1; 99 pages.

"3GPP TS 36.300 V8.3.0—3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; Release 8"; 3GPP Organizational Partners; Dec. 2007; Part 2; 22 pages.

"3GPP TS 36.300 V8.4.0—3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; Release 8"; 3GPP Organizational Partners; Jan. 2008; 126 pages.

"3GPP TS 36.321 V8.1.0—3rd Generation Partnership Project; Technical Specification Group Radio Access Network; Evolved Universal Terrestrial Radio Access (E-UTRA); Medium Access Control (MAC) Protocol Specification (Release 8)"; 3GPP Organizational Partners; Mar. 2008; 30 pages.

"3GPP TS 36.321 V8.2.0—3rd Generation Partnership Project; Technical Specification Group Radio Access Network; Evolved Universal Terrestrial Radio Access (E-UTRA) Medium Access Control (MAC) Protocol Specification (Release 8)"; 3GPP Organizational Partners; May 2008; 33 pages.

Cai, Zhijun; U.S. Appl. No. 12/052,887; "Channel Quality Indicator Transmission Timing with Discontinuous Reception"; filed Mar. 21, 2008; Specification 35 pages; Drawing Sheets (Figs. 1-2, 3a-3c, 4a-4b, 5a-5b, 6-9).

Cai, Zhijun; U.S. Appl. No. 12/058,448; "Precoding Matrix Index Feedback Interaction with Discontinuous Reception" filed Mar. 28, 2008; Specification 37 pages; Drawing Sheet (Figs. 1-2, 3a-3f, 4a-4b, 5a-5b, 6-9).

Ericsson; "Clarification of DRX"; 3GPP TSG-RAN2 Meeting #62-bis; Warsaw, Poland; Jun. 30-Jul. 4, 2008; 3 pages.

Ericsson; "Interactions between DRx and CL HARQ" (R2-074046); TSG-RAN WG2 Meeting #59bis; Shanghai, China; Oct. 8-12, 2007; 2 pages.

Ericsson; "Channel Feedback Format Selection" (R1-074854); 3GPP TSG-RAN WG1 Meeting #51; Korea; Nov. 5-9, 2007; 6 pages.

Feng, Chen et al.; "A Joint Unitary Precoding and Scheduling Algorithm for MIMO-OFDM System with Limited Feedback"; IEEE 2007 International Symposium on Microwave, Antenna, Propagation, and EMC Technologies for Wireless Communications; 2007; pp. 9-12.

Love, David et al.; "Grassmannian Precoding for Spatial Multiplexing Systems"; The University of Texas at Austin; Austin, Texas; Oct. 2003; 3 pages.

Motorola; "Views on Remaining Issues on UL Sounding RS for E-UTRA"; 3GPP TSG RAN WG1 #51 (R1-074574); Jeju, Korea; Nov. 5-9, 2007; 7 pages.

Nokia; "DRX Parameters in LTE"; 3GPP TSG-RAN WG2 Meeting #57bis; St. Julian's, Malta; Mar. 26-30, 2007;7 pages.

Nokia Siemens Networks; "Clean Up and Update on Security, Scheduling, Mobility, MBMS and DRX" (R2-075449); Change Request

(56) References Cited

OTHER PUBLICATIONS 36.300 CR NUM rev. 8.2.0; 3GPP TSG-RAN2 Meeting #60; Jeju, South Korea; Nov. 5-9, 2007; 106 pages.
Nokia Corporation, Nokia Siemens Networks; "Stage 3 Description of DRX"; 3GPP TSG-RAN WG2 Meeting #60bis (R2-080552); Sevilla, Spain; Jan. 14-18, 2008; 7 pages.
Nokia Corporation, Nokia Siemens Networks; "DL HARQ Operation with DRX"; 3GPP TSG-RAN WG2 Meeting #59bis (R2-073944); Shanghai, China; Oct. 8-12, 2001; 6 pages.
NTT DoCoMo, Inc.; "RRC_Connected DRX and Dedicated UL Resources"; 3GPP TSG RAN WG2 #60bis (R2-080462); Sevilla, Spain; Jan. 14-18, 2008; 2 pages.
NTT DoCoMo, Inc.; "UL SRS Resource Release at TA Timer Expiry"; 3GPP TSG RAN WG2 #60bis (R2-080454); Sevilla, Spain; Jan. 14-18, 2008; 1 page.
Panasonic et al.; "Proposed Way Forward for CQI Feedback Control and Content in E-UTRA" (R1-072076); 3GPP TSG-RAN WG1 Meeting #49; Kobe, Japan; May 7-11, 2007; 2 pages.
Panasonic; "CQI Reporting during DRX Operation"; 3GPP TSG-RAN WG2 #61, R2-080871; Sorrento, Italy; Feb. 11-15, 2008; 3 pages.
Research in Motion Limited; "Some Details on CQI Transmission during DRX"; TSG-RAN WG2 #61-bis, R2-081866; Shenzhen, China; Mar. 31-Apr. 4, 2008; 10 pages.
Research in Motion Limited; "MIMO Related Uplink Feedback during DRX"; TSG-RAN WG2 #62-bis, R2-083434; Warsaw, Poland; Jun. 23-Jul. 4, 2008; 2 pages.
Research in Motion Limited; "Consideration of DRX and SPS Alignment" ; 3GPP TSG-RAN2 #65, R2-091481; Athens, Greece, Feb. 9, 2009; 4 pages.
Texas Instruments; "Scheduling Request and DRX" (R1-071472); 3GPP TSG RAN WG1 #48bis; St. Julians, Malta; Mar. 26-30, 2007; 5 pages.
TSG RAN WG2; "LS on DRX Interval and CQI Reporting Cycle in LTE"; 3GPP TSG RAN WG1 Meeting #48 (R1-070643); St. Louis, United States; Feb. 12-16, 2007; 2 pages.
Yu, Yi; U.S. Appl. No. 12/058,444; "Rank Indicator Transmission during Discontinuous Reception"; filed Mar. 28, 2008; Specification 38 pages; Drawing Sheets (Figs 1-2, 3a-3f, 4a-4b, 5a-5b, 6-9).
Office Action issued in U.S. Appl. No. 12/865,652 on Dec. 8, 2011; 17 pages.
Office Action issued in U.S. Appl. No. 12/865,652 on May 16, 2012; 19 pages.
Office Action issued in U.S. Appl. No. 12/865,652 on Dec. 13, 2012; 18 pages.
Office Action issued in U.S. Appl. No. 12/865,652 on May 8, 2013; 18 pages.
Office Action issued in U.S. Appl. No. 13/244,805 on Dec. 8, 2011; 21 pages.
Office Action issued in U.S. Appl. No. 13/244,805 on May 16, 2012; 22 pages.
Office Action issued in U.S. Appl. No. 13/244,805 on Dec. 12, 2012; 25 pages.
Office Action issued in U.S. Appl. No. 13/244,805 on May 8, 2013; 25 pages.
Office Action issued in U.S. Appl. No. 14/086,302 on Jul. 3, 2014.
Office Action issued in U.S. Appl. No. 12/058,448 on Feb. 2, 2011; 13 pages.
Office Action issued in U.S. Appl. No. 12/058,448 on Apr. 26, 2011; 18 pages.
Advisory Action issued in U.S. Appl. No. 12/058,448 on Jul. 15, 2011; 3 pages.
Notice of Allowance issued in U.S. Appl. No. 12/058,444 on Jan. 18, 2012; 11 pages.
Office Action issued in U.S. Appl. No. 13/449,575 on Jan. 15, 2014.
Notice of Allowance issued in U.S. Appl. No. 13/449,575 on May 8, 2014; 7 pages.
Office Action issued in U.S. Appl. No. 12/058,444 on Jul. 8, 2011; 18 pages.
Notice of Allowance issued in U.S. Appl. No. 12/058,444 on Mar. 1, 2012; 13 pages.
Office Action issued in U.S. Appl. No. 13/467,937 on Feb. 3, 2014; 18 pages.
Notice of Allowance issued in U.S. Appl. No. 13/467,937 on May 14, 2014; 7 pages.
Office Action issued in U.S. Appl. No. 12/052,887 on Jan. 10, 2011; 13 pages.
Notice of Allowance issued in U.S. Appl. No. 12/052,887 on Jun. 29, 2011; 10 pages.
Notice of Allowance issued in U.S. Appl. No. 12/052,887 on Oct. 12, 2011; 8 pages.
Office Action issued in U.S. Appl. No. 13/247,770 on Oct. 1, 2012; 14 pages.
Notice of Allowance issued in U.S. Appl. No. 13/247,770 on Feb. 7, 2013; 8 pages.
International Search Report and Written Opinion of the International Searching Authority issued in International Application No. PCT/US2009/032591 on May 28, 2009; 9 pages.
International Preliminary Report on Patentability issued in International Application No. PCT/US2009/032591 on May 19, 2010; 8 pages.
International Search Report and Written Opinion of the International Searching Authority issued in International Application No. PCT/US2009/037854 on Aug. 3, 2009; 13 pages.
Written Opinion of the International Preliminary Examining Authority issued in International Application No. PCT/US2009/037854 on Feb. 23, 2010; 7 pages.
International Preliminary Report on Patentability issued in International Application No. PCT/US2009/037854 on Jun. 30, 2010; 16 pages.
International Search Report and Written Opinion of the International Searching Authority issued in International Application No. PCT/US2009/036013 on Oct. 1, 2009; 8 pages.
International Preliminary Report on Patentability issued in International Application No. PCT/US2009/036013 on Sep. 28, 2010; 6 pages.
International Search Report and Written Opinion of the International Searching Authority issued in International Application No. PCT/US2009/037704 on Oct. 28, 2009; 10 pages.
Written Opinion of the International Preliminary Examining Authority issued in International Application No. PCT/US2009/037704 on Apr. 13, 2010; 6 pages.
International Preliminary Report on Patentability issued in International Application No. PCT/US2009/037704 on Aug. 9, 2010; 6 pages.
Examiner's First Report issued in Australian Application No. 2009212717 on Mar. 19, 2012; 2 pages.
Notice of Acceptance issued in Australian Application No. 2009212717 on Mar. 25, 2013; 3 pages.
Corrected Notice of Acceptance issued in Australian Application No. 2009212717 on Apr. 29, 2013; 1 page.
Examiner's First Report issued in Australian Application No. 2009228496 on Jun. 29, 2012; 3 pages.
Notice of Acceptance issued in Australian Application No. 2009228496 on May 6, 2013; 1 page.
Examiner's First Report issued in Australian Application No. 2009228889 on Jun. 1, 2012; 2 pages.
Notice of Acceptance issued in Australian Application No. 2009228889 on Sep. 6, 2012; 3 pages.
Examiner's First Report issued in Australian Application No. 2012265583 on Nov. 6, 2013;3 pages.
Notice of Acceptance issued in Australian Application No. 2012265583 on Feb. 17, 2014; 2 pages.
Examiner's First Report issued in Australian Application No. 2009225546 on Aug. 15, 2012; 3 pages.
Patent Examination Report No. 2 issued in Australian Application No. 2009225546 on May 3, 2013; 3 pages.
Patent Examination Report No. 3 issued in Australian Application No. 2009225546 on Sep. 17, 2013; 3 pages.
Office Action issued in Canadian Application No. 2,713,870 on Mar. 28, 2012; 2 pages.

(56) References Cited

OTHER PUBLICATIONS

Notice of Allowance issued in Canadian Application No. 2.713.870 on Apr. 4, 2013; 1 page.
Office Action issued in Canadian Application No. 2,719,814 on Nov. 22, 2012; 3 pages.
Office Action issued in Canadian Application No. 2,719,814 on Jan. 31, 2014; 2 pages.
Office Action issued in Canadian Application No. 2,719,818 on Dec. 27, 2012; 4 pages.
Office Action issued in Canadian Application No. 2,719,818 on Dec. 23, 2013; 3 pages.
Office Action issued in Canadian Application No. 2,719,111 on Feb. 25, 2013; 3 pages.
Office Action issued in Chinese Application No. 200980108418.1 on Sep. 28, 2012; 11 pages.
Office Action issued in Chinese Application No. 200980108418.1 on May 9, 2013; 7 pages.
Notification of Grant issued in Chinese Application No. 200980108418.1 on Dec. 6, 2013; 4 pages.
Office Action issued in Chinese Application No. 200980111178.0 on Oct. 8, 2012; 12 pages.
Office Action issued in Chinese Application No. 200980111178.0 on May 22, 2013; 9 pages.
Office Action issued in Chinese Application No. 200980111178.0 on Nov. 22, 2013; 17 pages.
Rejection Decision issued in Chinese Application No. 200980111178.0 on Jun. 10, 2014; 21 pages.
Office Action issued in Chinese Application No. 200980111154.5 on Oct. 9, 2012; 7 pages.
Office Action issued in Chinese Application No. 200980111154.5 on Jun. 24, 2013; 5 pages.
Notice of Allowance issued in Chinese Application No. 200980111154.5 on Jan. 7, 2014; 4 pages.
Office Action issued in Chinese Application No. 200980116711.2 on Oct. 30, 2012; 14 pages.
Office Action issued in Chinese Application No. 200980116711.2 on Jul. 9, 2013; 7 pages.
Office Action issued in Chinese Application No. 200980116711.2 on Jan. 22, 2014; 6 pages.
Notice of Allowance issued in Chinese Application No. 200980116711.2 on Jun. 23, 2014; 4 pages.
Communication Pursuant to Article 94(3) EPC issued in European Application No. 09708667.2 on May 22, 2013; 6 pages.
Communication Pursuant to Article 94(3) EPC issued in European Application No. 09708667.2 on Oct. 16, 2013; 4 pages.
Communication under Rule 71(3) EPC issued in European Application No. 09726227.3 on Nov. 18, 2011; 6 pages.
Extended European Search Report issued in European Application No. 12166031.0 on Aug. 28, 2012; 9 pages.
Communication under Rule 71(3) EPC issued in European Application No. 12166031.0 on Oct. 21, 2013; 45 pages.
Extended European Search Report issued in European Application No. 12166036.9 on Jun. 18, 2012; 9 pages.
Communication under Rule 71(3) EPC issued in European Application No. 12166036.9 on Oct. 22, 2013; 45 pages.
Extended European Search Report issued in European Application No. 13193529.8 on Dec. 20, 2013; 6 pages.
Extended Search Report issued in European Application No. 09155546.6 on Aug. 27, 2009; 7 pages.
Examination Report issued in European Application No. 09155546.6 on Feb. 10, 2010; 5 pages.
Examination Report issued in European Application No. 09155546.6 on Jan. 10, 2011; 5 pages.
Communication under Rule 71(3) EPC issued in European Application No. 09155546.6 on Jul. 1, 2011; 42 pages.
Extended Search Report issued in European Application No. 11191226.7 on Apr. 27, 2012; 9 pages.
Communication Pursuant to Article 94(3) EPC issued in European Application No. 11191226.7 on Jul. 3, 2014; 7 pages.
Extended Search Report issued in European Application No. 12156166.6 on Apr. 27, 2012; 9 pages.
Communication Pursuant to Article 94(3) EPC issued in European Application No. 12156166.6 on Jun. 18, 2014.
Extended Search Report issued in European Application No. 12156271.4 on Jul. 2, 2012; 11 pages.
Communication pursuant to Article 94(3) EPC issued in European Application No. 12156271.4 on Jun. 20, 2014.
Extended European Search Report issued in European Application No. 14163883.3 on Jun. 18, 2014.
Extended Search Report issued in European Application No. 08153857.1 on Aug. 21, 2008; 12 pages.
Examination Report issued in European Application No. 08153857.1 on Jan. 27, 2010; 6 pages.
Examination Report issued in European Application No. 08153857.1 on Jan. 11, 2011; 9 pages.
Communication Pursuant to Article 94(3) EPC issued in European Application No. 08153857.1 on May 7, 2012; 7 page.
Summons to Attend Oral Proceedings issued in European Application No. 08153857.1 on Aug. 7, 2013; 8 pages.
Official Action issued in Japanese Application No. 2010-545193 on Apr. 26, 2012; 7 pages.
Official Action issued in Japanese Application No. 2012-191838 on Aug. 6, 2013; 11 pages.
Notice of Allowance issued in Japanese Application No. 2012-191838 on Apr. 17, 2014; 3 pages—no translation.
Official Action issued in Japanese Application No. 2011-501938 on Dec. 20, 2012; 5 pages.
Official Action issued in Japanese Application No. 2011-501938 on Sep. 6, 2013; 4 pages.
Office Action issued in Japanese Application No. 2011-501875 on Jul. 20, 2012; 7 pages.
Office Action issued in Japanese Application No. 2011-501875 on Dec. 20, 2012; 14 pages.
Office Action issued in Japanese Application No. 2011-500964 on Jun. 14, 2012; 4 pages.
Office Action issued in Japanese Application No. 2012-234345 on Oct. 16, 2013; 8 pages.
Office Action issued in Japanese Application No. 2012-234345 on Feb. 4, 2014; 2 pages.
Office Action issued in Korean Application No. 10-2010-7019553 on Jan. 30, 2012; 8 pages.
Office Action issued in Korean Application No. 10-2012-7008432 on May 23, 2012; 10 pages.
Notice of Allowance issued in Korean Application No. 10-2012-7008432 on Nov. 29, 2012; 3 pages.
Notice of Decision for Patent issued in Korean Application No. 10-2010-7019553 on Jun. 19, 2012; 3 pages.
Office Action issued in Korean Application No. 10-2010-07024168 on Feb. 14, 2012; 10 pages.
Notice of Allowance issued in Korean Application No. 10-2010-07024168 on Oct. 30, 2012; 3 pages.
Office Action issued in Korean Application No. 10-2010-7024169 on Aug. 18, 2011; 9 pages.
Office Action issued in Korean Application No. 10-2010-7024169 on Apr. 24, 2012; 6 pages.
Notice of Allowance issued in Korean Application No. 10-2010-7024169 on Jan. 14, 2014; 3 pages.
Office Action issued in Korean Application No. 10-2011-7027613 on Jun. 5, 2014; 4 pages.
Office Action issued in Korean Application No. 10-2012-7023475 on Aug. 28, 2014; 4 pages.
Office Action issued in Korean Application No. 10-2010-7023425 on Aug. 23, 2011; 8 pages.
Notice of Allowance issued in Korean Application No. 10-2010-7023425 on Nov. 30, 2011; 3 pages.
Office Action issued in Korean Application No. 10-2011-7025141 on Jul. 1, 2014; 4 pages. No translation yet.
Official Action issued in Mexican Application No. MX/a/2010/008477 on Jul. 15, 2011; 3 pages.
Official Action issued in Mexican Application No. MX/a/2010/008477 on Jan. 31, 2012; 5 pages.

(56) References Cited

OTHER PUBLICATIONS

Official Action issued in Mexican Application No. MX/a/2010/008477 on Oct. 3, 2012; 5 pages.
Official Action issued in Mexican Application No. MX/a/2010/008477 on Apr. 12, 2013; 2 pages.
Notice of Allowance issued in Mexican Application No. MX/a/2010/008477 on Aug. 27, 2013; 1 page. No translation.
Notice of Allowance issued in Mexican Application No. MX/a/2010/010636 on Aug. 5, 2011; 1 page.
Office Action issued in Canadian Application No. 2,719,818 on Nov. 3, 2014; 3 pages.
Communication under Rule 71(3) EPC issued in European Application No. 09708667.2 on Nov. 5, 2014; 44 pages.
Notice of Allowance issued in Korean Application No. 10-2011-7027613 on Nov. 12, 2014; 3 pages.
Communication under Rule 71(3) EPC issued in European Application No. 13193529.8 on Dec. 2, 2014; 43 pages.
United States Office Action in U.S. Appl. No. 14/170,206, dated Oct. 22, 2014, 35 pages.
United States Office Action in U.S. Appl. No. 14/179,227, dated Oct. 21, 2014, 34 pages.

* cited by examiner

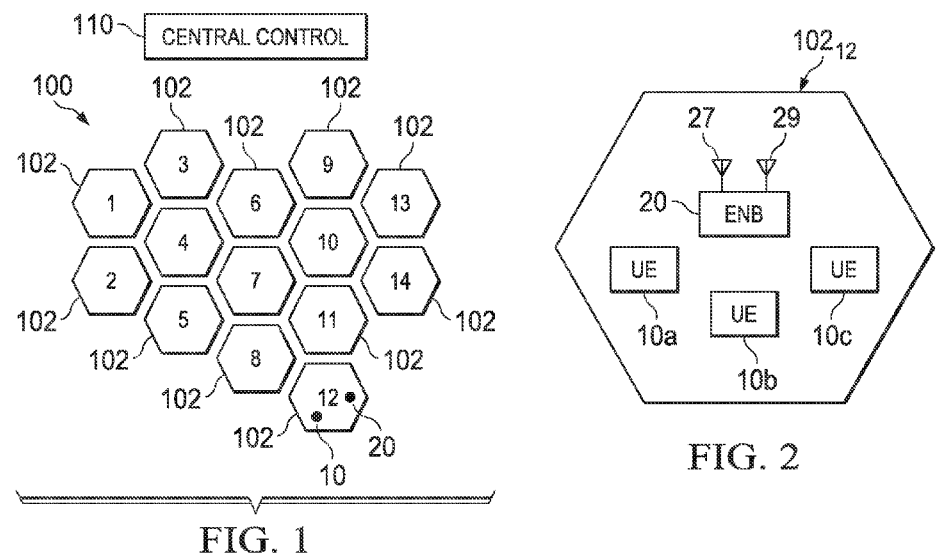
FIG. 1
FIG. 2
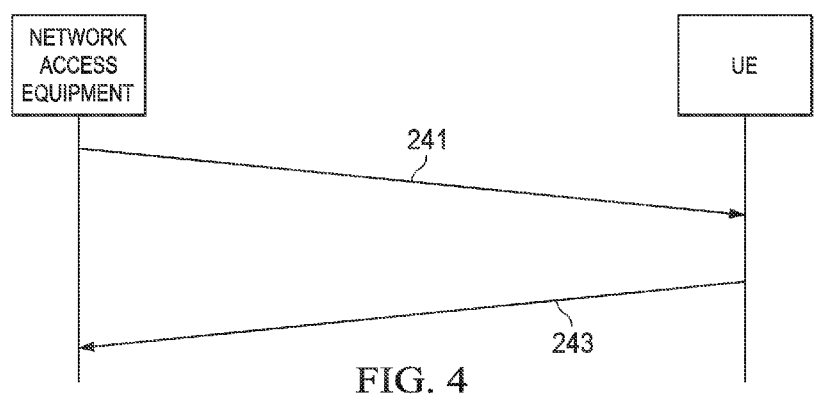
FIG. 4

SYSTEM AND METHOD FOR UPLINK TIMING SYNCHRONIZATION IN CONJUNCTION WITH DISCONTINUOUS RECEPTION

RELATED APPLICATIONS

This application is a continuation of U.S. patent application Ser. No. 14/086,302, filed on Nov. 21, 2013, which is a continuation of U.S. patent application Ser. No. 13/244,805, filed on Sep. 26, 2011 and issued as U.S. Pat. No. 8,594,035 on Nov. 26, 2013, which is a continuation of U.S. patent application Ser. No. 12/865,652, filed on Jan. 20, 2011 and issued as U.S. Pat. No. 8,634,361 on Jan. 21, 2014, which is a U.S. National Stage of PCT/US2009/032591, filed on Jan. 30, 2009, which claims the benefit of U.S. Provisional Patent Application No. 61/025,485 filed on Feb. 1, 2008, the applications are hereby incorporated by reference in their entirety.

FIELD OF APPLICATION

The application relates to uplink timing synchronization in a wireless communication system.

BACKGROUND

In traditional wireless telecommunications systems, transmission equipment in a base station transmits signals throughout a geographical region known as a cell. As technology has evolved, more advanced network access equipment has been introduced that can provide services that were not possible previously. This advanced network access equipment might include, for example, an enhanced node-B (eNB) rather than a base station or other systems and devices that are more highly evolved than the equivalent equipment in a traditional wireless telecommunications system. Such advanced or next generation equipment is typically referred to as long-term evolution (LTE) equipment. For LTE equipment, the region in which a wireless device can gain access to a telecommunications network might be referred to by a name other than "cell", such as "hot spot". As used herein, the term "cell" will be used to refer to any region in which a wireless device can gain access to a telecommunications network, regardless of whether the wireless device is a traditional cellular device, an LTE device, or some other device.

Devices that might be used by users in a telecommunications network can include both mobile terminals, such as mobile telephones, personal digital assistants, handheld computers, portable computers, laptop computers, tablet computers and similar devices, and fixed terminals such as residential gateways, televisions, set-top boxes and the like. Such devices will be referred to herein as user equipment or UE.

In wireless communication systems, transmission from the network access equipment (e.g., eNB) to the UE is referred to as a downlink transmission. Communication from the UE to the network access equipment is referred to as an uplink transmission. Wireless communication systems generally require maintenance of timing synchronization to allow for continued communications. Maintaining uplink synchronization can be problematic, wasting throughput and/or decreasing battery life of an UE given that a UE may not always have data to transmit.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 1 is a schematic diagram of a cellular network according to an embodiment of the disclosure;

FIG. 2 is a schematic diagram of a cell in a cellular network according to an embodiment of the disclosure;

FIG. 4 is a signaling diagram between Network Access Equipment and a User Equipment;

DETAILED DESCRIPTION

Figure 3:
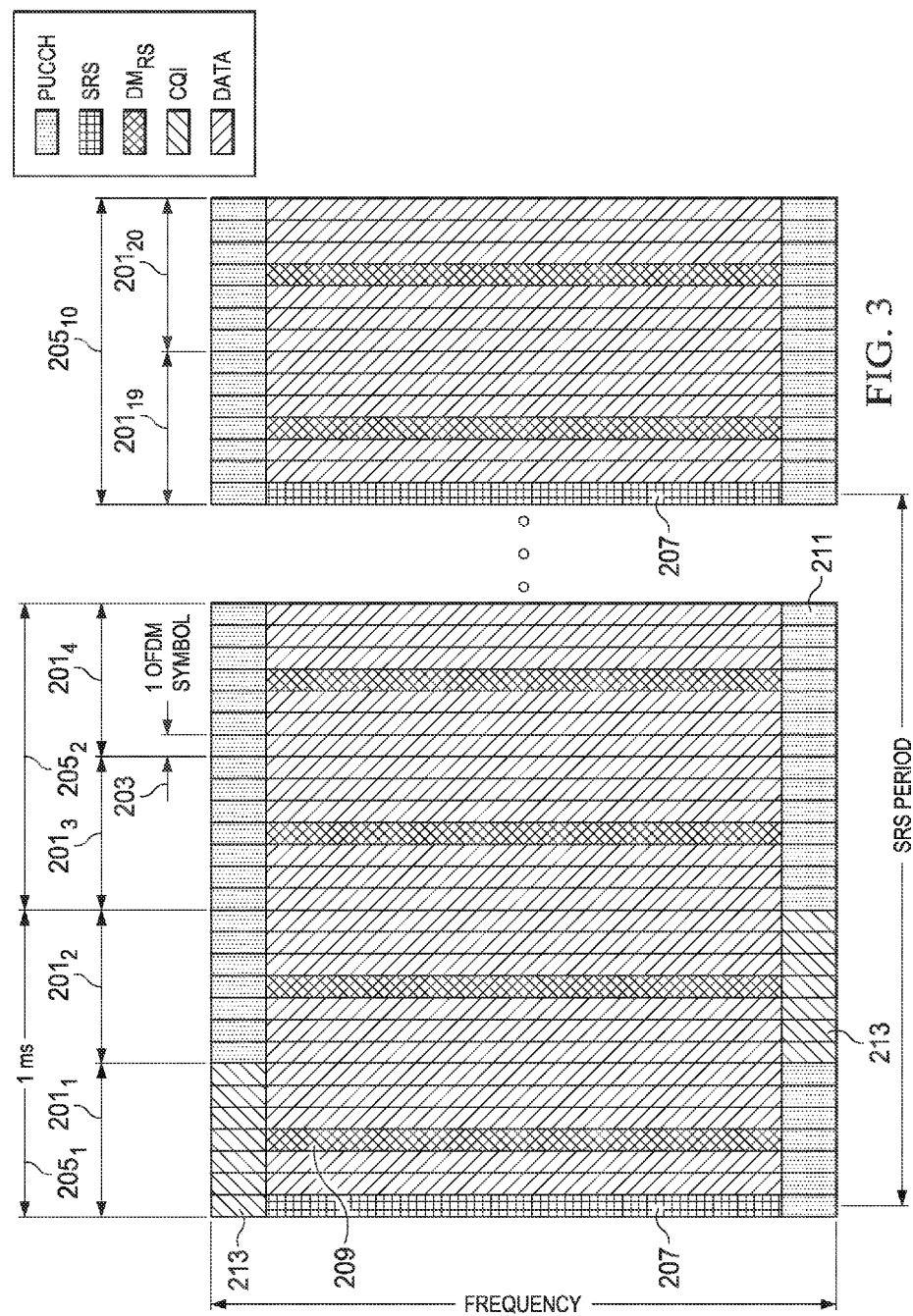
FIG. 3 is a schematic diagram of a possible uplink transmission channel.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

FIG. 1 illustrates an exemplary cellular network 100 according to an embodiment of the disclosure. The cellular network 100 may include a plurality of cells $102_1$, $102_2$, $102_3$, $102_4$, $102_5$, $102_6$, $102_7$, $102_8$, $102_9$, $102_{10}$, $102_{11}$, $102_{12}$, $102_{13}$, and $102_{14}$ (collectively referred to as cells 102). As is apparent to persons of ordinary skill in the art, each of the cells 102 represents a coverage area for providing cellular services of the cellular network 100 through communication from a network access equipment (e.g., eNB). While the cells 102 are depicted as having non-overlapping coverage areas, persons of ordinary skill in the art will recognize that one or more of the cells 102 may have partially overlapping coverage with adjacent cells. In addition, while a particular number of the cells 102 are depicted, persons of ordinary skill in the art will recognize that a larger or smaller number of the cells 102 may be included in the cellular network 100.

One or more UEs 10 may be present in each of the cells 102. Although only one UE 10 is depicted and is shown in only one cell 102₁₂, it will be apparent to one of skill in the art that a plurality of UEs 10 may be present in each of the cells 102. A network access equipment 20 in each of the cells 102 performs functions similar to those of a traditional base station. That is, the network access equipments 20 provide a radio link between the UEs 10 and other components in a telecommunications network. While the network access equipment 20 is shown only in cell 102₁₂, it should be understood that network access equipment would be present in each of the cells 102. A central control 110 may also be present in the cellular network 100 to oversee some of the wireless data transmissions within the cells 102.

FIG. 2 depicts a more detailed view of the cell 102₁₂. The network access equipment 20 in cell 102₁₂ may promote communication via a transmitting antenna 27 connected to a transmitter, a receiving antenna 29 connected to a receiver, and/or other well known equipment. Similar equipment might be present in the other cells 102. A plurality of UEs 10 (10a, 10b, 10c) are present in the cell 102₁₂, as might be the case in the other cells 102. In the present disclosure, the cellular systems or cells 102 are described as engaged in certain activities, such as transmitting signals; however, as will be readily apparent to one skilled in the art, these activities would in fact be conducted by components comprising the cells.

In each cell, the transmissions from the network access equipment 20 to the UEs 10 are referred to as downlink transmissions, and the transmissions from the UEs 10 to the network access equipment 20 are referred to as uplink transmissions. The UE may include any device that may communicate using the cellular network 100. For example, the UE may include devices such as a cellular telephone, a laptop computer, a navigation system, or any other devices known to persons of ordinary skill in the art that may communicate using the cellular network 100.

The format of an uplink channel is shown schematically in FIG. 3. The uplink channel is representative of a two dimensional time-frequency resource, in which frequency is indicated along the vertical axis and time, in the form of OFDM symbols, slots, sub-frames and frames are indicated on the horizontal axis. The transmission can be one of a number of different bandwidths (e.g., 1.25, 5, 15, or 20 MHz). In the time domain, the uplink is broken into frames, sub-frames and slots. Each slot 201 (shown as slots 201₁, 201₂, . . . , 201₁₉, 201₂₀, collectively slots 201) is made up of seven orthogonal frequency division multiplexed (OFDM) symbols 203. Two slots 201 make up a sub-frame 205 (sub-frames 205₁, 205₂, . . . , 205₁₀, collectively are sub-frames 205). A frame is a collection of 10 contiguous sub-frames. Because the exact details of a sub-frame 205 may vary depending upon the exact implementation, the following description is provided as an example only. The UE will transmit using a constant-amplitude and zero-autocorrelation (CAZAC) sequence so that more than one UE may transmit simultaneously. The demodulation (DM) reference symbol (RS) is placed on the fourth symbol 209 of each slot; and a control channel 211 is taken up by at least one resource block on the very outside edges of the frequency band.

In some embodiments, a sounding reference signal (SRS) is considered to be an uplink timing reference signal transmission. SRS are made available at the beginning, or end, of each sub-frame 205 and is broken down into several blocks of 12 sub-carriers (not individually shown) that correspond to the same frequency bandwidth as a resource block. A UE may use one or all of those frequency blocks depending on the transmission bandwidth selected. The UE may also use every other sub-carrier in one or more multiple frequency blocks. In the illustrated example, the SRS is shown in the first symbol 207 of the sub-frame 205₁ and of sub-frame 201₁₉. The transmission of SRSs is based on the time between subsequent SRS transmission by a single UE. FIG. 3 also shows where in time and frequency that the physical uplink control channel (PUCCH), which occurs on control channel 211, is placed. Control signaling takes place in the PUCCH. In one embodiment, the system implements a hybrid automatic repeat request (HARQ) acknowledgement (ACK)/negative acknowledgement (NACK) feedback. An ACK or NACK is sent on the PUCCH 211 by the UE to the eNB to indicate whether a packet transmitted from the eNB was received at that UE. A physical uplink shared channel (PUSCH) is used to send user data.

The above description of the uplink channel is one implementation of an uplink channel. It will be appreciated that other uplink channel configurations may be used wherein an uplink timing reference signal transmission (e.g., SRS) is sent during any portion of the uplink message, not necessarily only at the beginning or end of a specified time interval (e.g., slot).

In order to maintain uplink synchronization, it is desirable for the network access equipment 20 (shown in FIG. 1) to calculate the uplink channel conditions by analyzing signals sent from the UE 10. One possible signaling diagram of signals sent between the network access equipment 20 and the UE 10 is shown in FIG. 4. In this embodiment, the network access equipment 20 instructs the UE 10 when to send an uplink timing reference signal transmission (e.g., SRS), through use of an uplink timing reference signal transmission instruction message 241. The uplink timing reference signal transmission instruction message 241 may include any one of a variety of instructions. For example, the network access equipment 20 may instruct the UE 10 via the timing reference signal transmission instruction message 241 to send the timing reference signal transmissions at a constant rate, or in bursts depending on the velocity of the UE 10 relative to the network access equipment 20. In a response 243, the UE 10 may send the timing reference signal transmissions (e.g., SRS) in accordance with the instructions of the network access equipment 20.

In order to conserve battery power in the UE, the UE may operate with discontinuous reception (DRX). Typically, the UE will turn its reception capability on and off in a repeating fashion. The network is aware of the DRX behavior and makes its transmission to the UE during periods that the reception capability is on. An "On" period followed by an "Off" period is a DRX cycle.

DRX in Connected Mode will be configured by the network. Part of the configuration is the setting of the DRX-cycle "On" Duration, inactivity timers and HARQ timer. During the "On" periods (periods the receiver is on each having a length specified by the "On Duration"), the UE will monitor the PDCCH (packet data control channel) or configured resource for the possible downlink transmissions. When a PDCCH is decoded successfully, an inactivity timer will be started. At the end of the "On" period, the UE may go back to sleep according to the DRX configuration.

SRS Transmission During DRX "On" Periods

In a first embodiment, the UE will transmit the SRS (more generally an uplink timing reference signal) only during DRX "On" periods. During DRX "Off" periods, the UE does not transmit SRS. In some embodiments, this involves signalling the UE to transmit the SRS with a desired repetition period, and the UE transmitting the SRS for each repetition period only if it occurs during a DRX "On" period. Depending on the alignment or lack of alignment between the SRS repetition period and the DRX "On" periods, there may or may not be SRS repetition periods for which no SRS is transmitted. If the SRS is to be transmitted during each and every SRS repetition period, this will require that the DRX cycle be as frequent, or more frequent than the desired SRS repetition period.

Figure 5A:
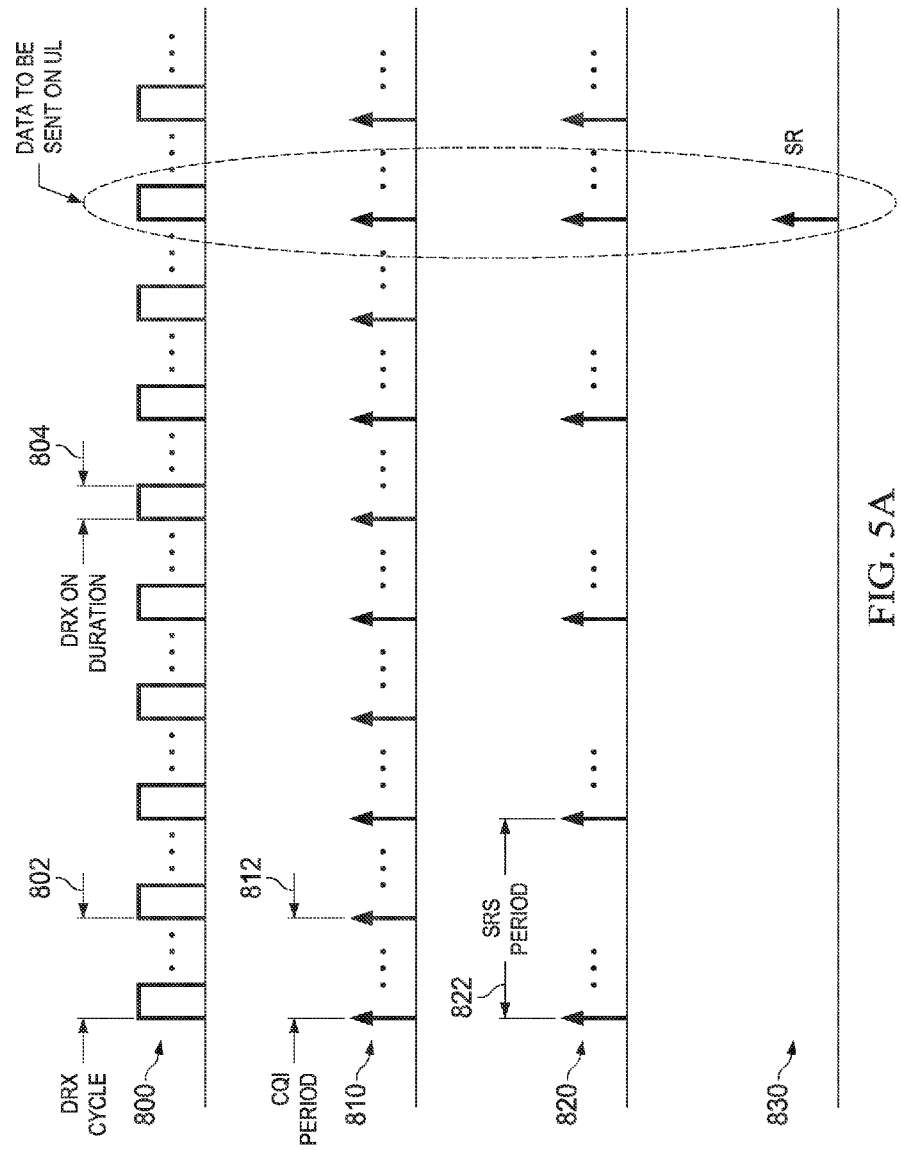
FIG. 5A is a timing diagram showing a first example of uplink timing reference signal timing having regard to discontinuous reception timing.

FIG. 5A shows a simple example of this where the SRS repetition period is a multiple (in this case the multiple is two) of the DRX cycle. In addition, for the example of FIG. 5A the SRS is less frequent than the CQI. Indicated at 800 is DRX timing in which there is a DRX cycle 802 that includes a DRX "On" Duration (indicated at 804) and a DRX "Off" Duration. The receiver is alternately turned on for "On" periods having the DRX "On" Duration and off for "Off" periods having the DRX "Off" Duration. Indicated at 810 is the CQI timing. The CQI has a CQI period 812 that is aligned with the DRX cycle. Specifically, the CQI is sent during the DRX "On" periods. Indicated at 820 is the timing of the SRS. The SRS has an SRS period 822. In this case, the SRS period 822 is double the DRX cycle 802. As such, so long as these cycle durations are in place, the SRS can be sent at the desired SRS period during DRX "On" periods.

SRS Transmission Irrespective of DRX "On" Periods

In some embodiments, the UE makes its SRS transmission irrespective of DRX in certain conditions. This is particularly appropriate in order to maintain the uplink time alignment for different UE's with high velocity. This will allow an SRS period to be established that is shorter than the DRX cycle as might be the case when the DRX cycle is particularly long, and/or when the SRS period has become particularly short due to mobility of the UE.

Figure 5B:
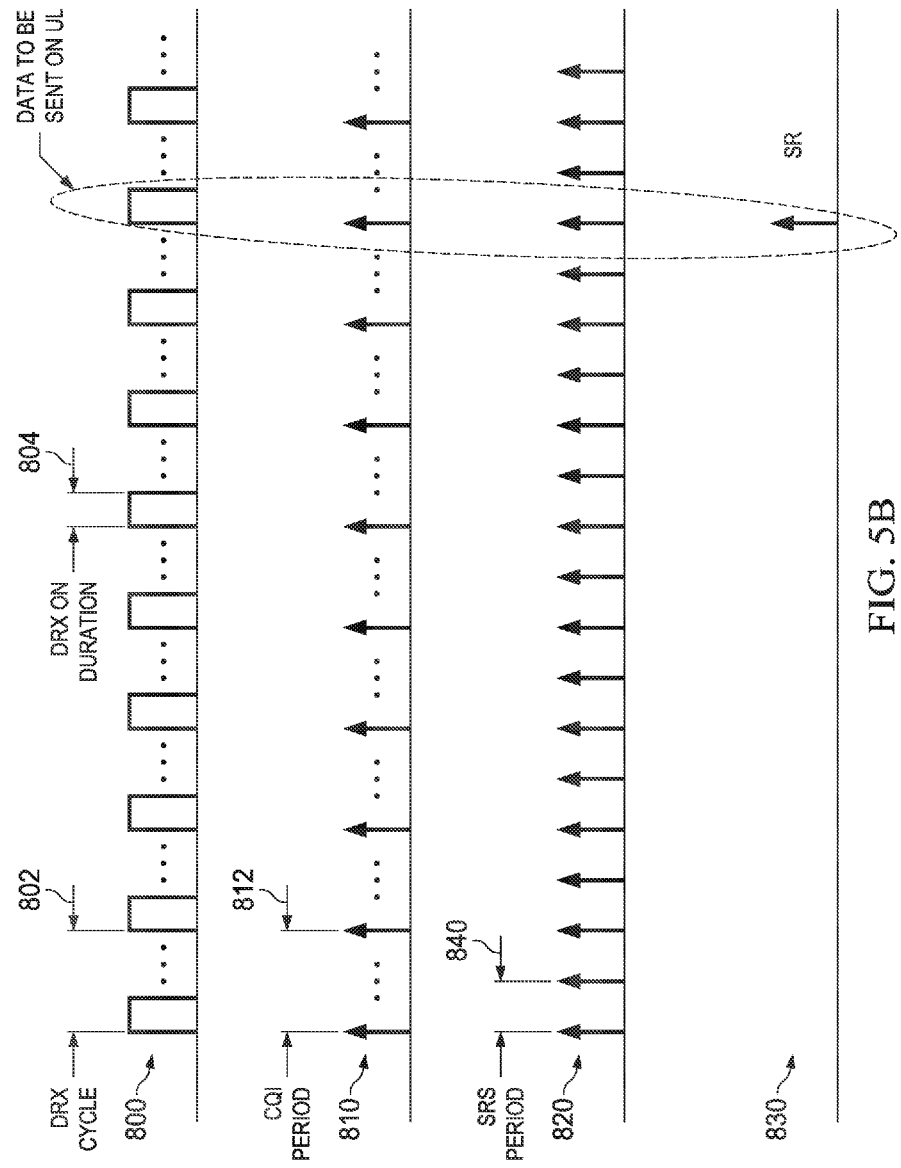
FIG. 5B is a timing diagram showing a second example of uplink timing reference signal timing having regard to discontinuous reception timing.

FIG. 5B shows an example of an SRS period that is smaller than the DRX cycle. As discussed above, this situation may be more common when the UE moves to the longer DRX cycles. If UL synchronization is to be maintained even during the longer DRX cycle (for example the 640 ms DRX cycle), then the SRS needs to still be transmitted, and depending on the mobility of the UE, it may need to be transmitted at a higher frequency than the DRX cycle. With reference to FIG. 5B, the DRX timing 800 and CQI timing 810 are the same as in FIG. 5A. In this case, the SRS timing 820 has an SRS period 840 that is half that of the CQI period 812, and that is shorter than the DRX cycle 802. In this case, the UE will need to turn its transmitter on outside the normal DRX "On" periods in order to be able to transmit all of the SRS transmissions.

Resource Release

In some embodiments, to avoid frequent reassignment or release, a resource is allocated for the UE to transmit the SRS, and this SRS resource is not released when the UE is not transmitting the SRS.

In some embodiments, an uplink timing alignment timer is employed. The timer represents the amount of time the UE is expected to be able to maintain uplink synchronization, after which it can be assumed that the UE should not transmit on the UL. The network transmits a timing alignment update command to the UE each time it computes new uplink timing based on received SRS from the UE to instruct the UE how to adjust its timing alignment. Once alignment has been lost, the UE will need to regain alignment when it next needs to transmit.

In some embodiments, the uplink timing alignment timer is run by the network. If no timing alignment update command has been sent within the period that the timer is running, then the timer will expire, and it is assumed that alignment is lost. In this event, some or all resources (e.g. CQI, SRS) allocated for UL communication are released. The network will inform the UE of when the timer expires.

In another embodiment, the timer may run on the UE in which case the network may inform the UE of the timer value. The timer is reset by the reception of a timing alignment (TA) update command.

Sub-Frame Selection

For the example of FIG. 5A, the CQI and SRS are both transmitted during DRX "On" Durations, although not necessarily with the same frequency. In another embodiment, to further save battery consumption, transmission of SRS and CQI is configured to be in the same sub-frame whenever feasible. An example of this is shown in FIG. 3 where the CQI 213 is sent in the same sub-frame 201$_1$ as the SRS 207. For the example of FIG. 5A, this should be possible for every SRS transmission since the SRS period is twice that of the CQI period. For the example of FIG. 5B, the SRS and CQI can be transmitted in the same sub-frame for every second SRS transmission.

In some embodiments, for the case where the UE is transmitting SRS only during DRX "On" durations, the CQI is also only transmitted during DRX "On" durations. In some embodiments, for the case where the UE is transmitting SRS irrespective of DRX "On" durations, the CQI is allowed to be transmitted during DRX "On" durations and can be transmitted during periods that the transmitter has been turned on irrespective of DRX "On" durations for the purpose of transmitting SRS.

The DTX (discontinuous transmission) periods do not necessarily align with the DRX periods. Once the SRS and CQI have been transmitted, the transmitter can be turned off, even though the receiver may still be on.

Scheduling Request Timing

FIGS. 5A and 5B also each show timing of scheduling requests (SR), generally indicated at 830. A scheduling request is an indication sent by the UE to the base station to request the UL resource. In some embodiments, the UE transmits scheduling requests only during DRX "On" periods. In a further enhancement, the UE transmits scheduling requests during a sub-frame that the transmitter is already on to transmit the CQI, the SRS or both. This can occur through network configuration of the UE, or at the initiative of the UE. Data may be sent from the UE during the DRX "On" period.

Combination of Methods

Figure 6A:
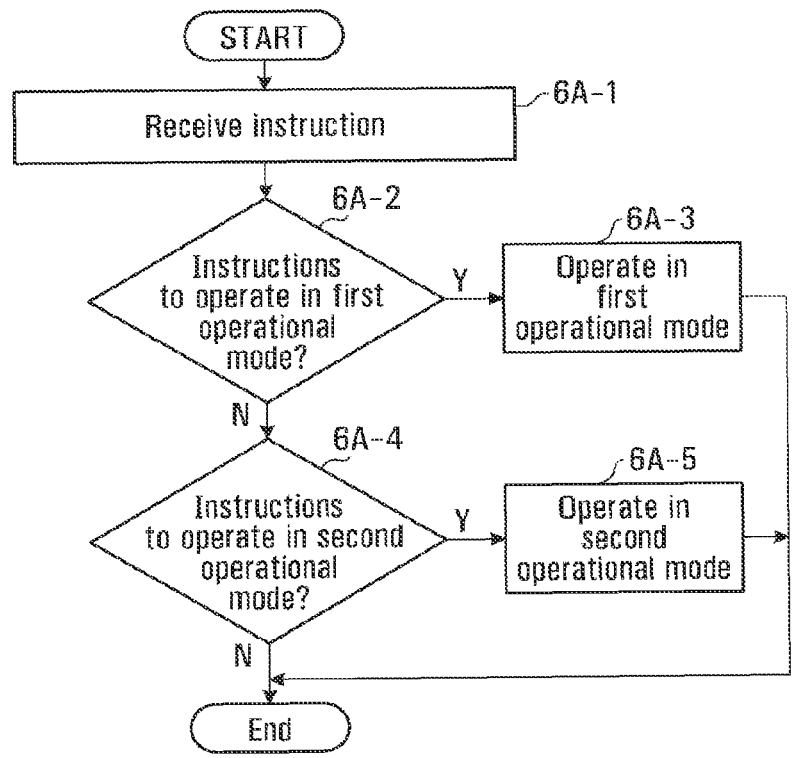
FIG. 6A is a flowchart corresponding to one UE embodiment.

In some embodiments, a combination of the above-described methods is employed in which sometimes the UE only transmits SRS during DRX "On" periods, referred to hereinafter as a first operational mode, and other times the UE transmits SRS irrespective of DRX "On" periods, referred to hereinafter as a second operational mode. FIG. 6A illustrates a flow chart of a specific example of such a method for SRS transmission in a UE 10. The method of FIG. 6A might be executed continuously, or when there is a change in SRS period and/or DRX cycle for example. The SRS period may change as a function of mobility of the UE, whereas the DRX cycle may change as a function of level of communications activity involving the UE. In block 6A-1, the UE receives an instruction from the network. If the instruction is to operate in the first operational mode (yes path, block 6A-2), the UE operates in the first operational mode at block 6A-3. If there are no instructions to operate in the first operational mode (no path, block 6A-2), a subsequent decision involves determining whether there is an instruction to operate in the second operational mode. If the instruction is to operate in the second operational mode (yes path, block 6A-4), the UE operates in the second operational mode at block 6A-5. More generally, in a first operational mode, the UE executes block 6A-3 and in a second operational mode, the UE executes block 6A-5. The conditions for executing the first or second operational mode may be as described above, or may be different. In some implementations, only the first operational mode is provided, or only the second operational mode is provided.

Figure 6B:
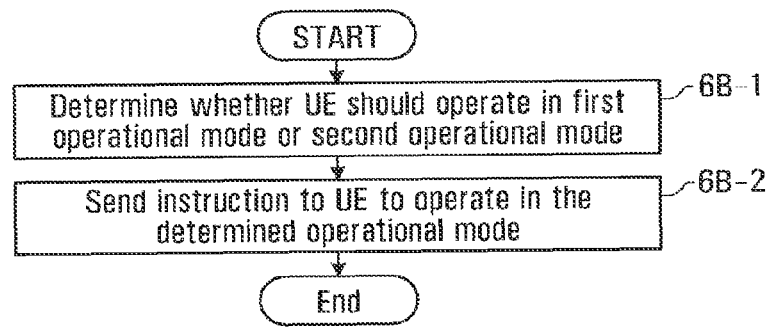
FIG. 6B is a flowchart corresponding to one network access equipment embodiment.

A flowchart of such an embodiment from the network perspective is shown in FIG. 6B. In block 6B-1, the network determines whether the UE should operate in the first operational mode or the second operational mode. This can be done as a function of mobility of the UE and/or channel utilization to name a few examples. At block 6B-2, the network sends an instruction to the UE to operate in the determined operational mode.

Figure 11:
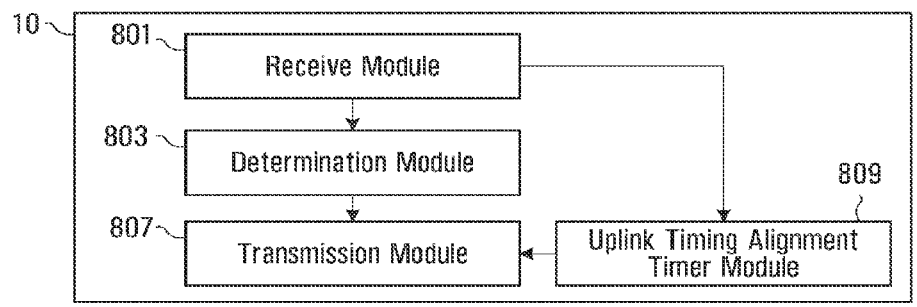
FIG. 11 is an exemplary block diagram of modules in the User Equipment.

In order to carry out the above processes, the UE 10 comprises a processor capable of performing the above process. For simplicity, the different functions have been broken out into different modules. These modules may be implemented separately or together. Further, these modules may be implemented in hardware, software, or some combination. Finally, these modules may reside in different portions of the UE memory. As illustrated in FIG. 11, the UE processor comprises a receive module 801, a determination module 803, and a transmission module 807. The receive module 801 receives a message or messages indicating an operational mode for SRS transmission. The determination module 803 determines the manner of transmitting the SRS having regard to the message. The determination module informs the transmission module 807 to send the SRS in accordance with the determination made by the determination module 803.

In some embodiments, the UE runs an uplink timing alignment timer as described above in which case the UE further comprises an uplink timing alignment timer module 809. The timer is reset upon receipt of a timing alignment update message by the receive module 801. If the timer expires, the UE releases the resource used for SRS transmission by the transmission module 807. In other embodiments, rather than the UE running a timer, the receive module 801 of the UE receives an instruction from the network that indicates timing has been lost in which case the UE releases the resource used for SRS transmission.

Figure 12:
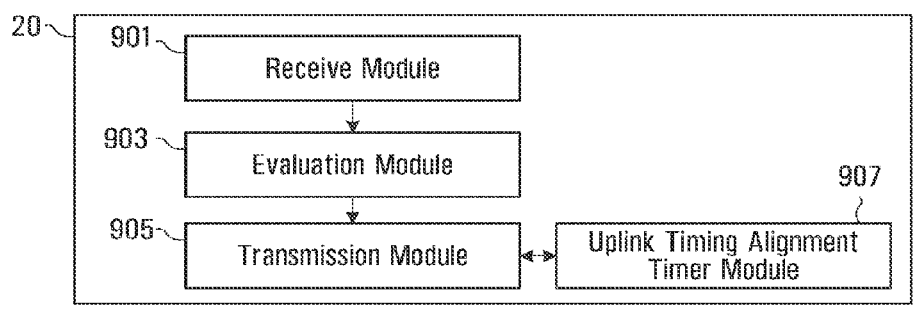
FIG. 12 is an exemplary block diagram of modules in the network access equipment.

Referring now to FIG. 12, the network access equipment 20 also comprises a processor. The processor comprises a receive module 901, an evaluation module 903 and a transmission module 905. Again, these modules are defined for simplicity, and may be executed in software, hardware, firmware, or both. Additionally, these modules may be stored in the same or different memories. The receiver module 901 receives SRS messages, CQI and other signals from the UE. The evaluation module 903 evaluates an appropriate DRX period and a desired SRS period. This may for example be done having regard to the activity of the UE, the mobility of the UE, and/or activity of the UE. The evaluation module determines an appropriate SRS transmission behavior having regard to the DRX behavior and SRS repetition period and instructs the transmission module 905 to signal this to the UE.

In some embodiments, the network runs an uplink timing alignment timer as described above in which case the processor further comprises an uplink timing alignment timer module 907. The timer is reset upon transmission of a timing alignment update message by the transmission module 905. In one embodiment, if the timer expires, the network sends an instruction to the UE to release the resource used for SRS transmission, and the network also releases the resource used for SRS transmission. In another embodiment, if the timer expires, the network released the resource used for SRS transmission without sending a message to the UE. In this second embodiment, the network may have previously sent a timer value to the UE. Because the UE may have used that timer value to start its own uplink alignment timer, the UE would not need a message from the network informing the UE that the timer had expired and the SRS resource is to be released.

Figure 7:
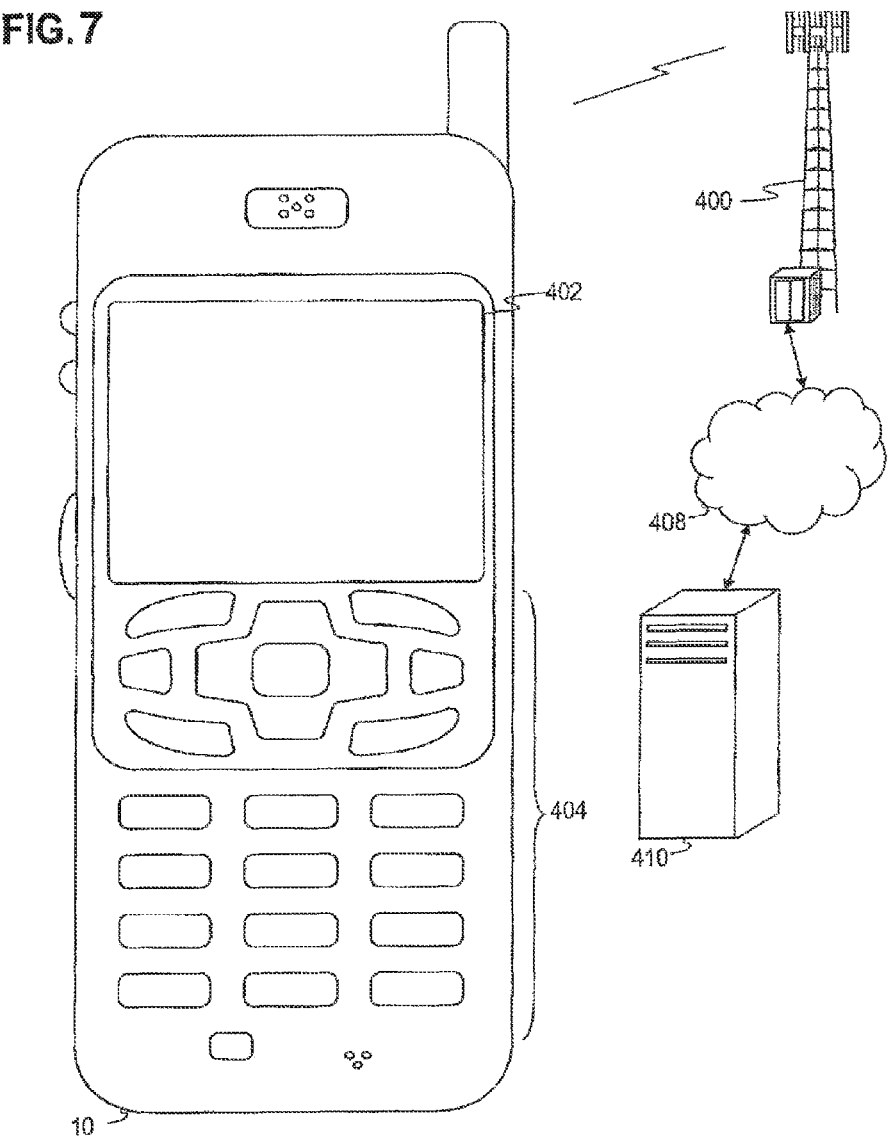
FIG. 7 is a diagram of a wireless communications system including a mobile device operable for some of the various embodiments of the disclosure.

FIG. 7 illustrates a wireless communications system including an embodiment of the UE 10. The UE 10 is operable for implementing aspects of the disclosure, but the disclosure should not be limited to these implementations. Though illustrated as a mobile phone, the UE 10 may take various forms including a wireless handset, a pager, a personal digital assistant (PDA), a portable computer, a tablet computer, or a laptop computer. Many suitable devices combine some or all of these functions. In some embodiments of the disclosure, the UE 10 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UE 10 may be a portable, laptop or other computing device. The UE 10 may support specialized activities such as gaming, inventory control, job control, and/or task management functions, and so on.

The UE 10 includes a display 402. The UE 10 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a track wheel, an exit or escape key, a trackball, and other navigational or functional keys, which may be inwardly depressed to provide further input function. The UE 10 may present options for the user to select, controls for the user to actuate, and/or cursors or other indicators for the user to direct.

The UE 10 may further accept data entry from the user, including numbers to dial or various parameter values for configuring the operation of the UE 10. The UE 10 may further execute one or more software or firmware applications in response to user commands. These applications may configure the UE 10 to perform various customized functions in response to user interaction. Additionally, the UE 10 may be programmed and/or configured over-the-air, for example from a wireless base station, a wireless access point, or a peer UE 10.

Among the various applications executable by the UE 10 are a web browser, which enables the display 402 to show a web page. The web page may be obtained via wireless communications with a wireless network access node, a cell tower, a peer UE 10, or any other wireless communication network or system 400. The network 400 is coupled to a wired network 408, such as the Internet. Via the wireless link and the wired network, the UE 10 has access to information on various servers, such as a server 410. The server 410 may provide content that may be shown on the display 402. Alternately, the UE 10 may access the network 400 through a peer UE 10 acting as an intermediary, in a relay type or hop type of connection.

Figure 8:
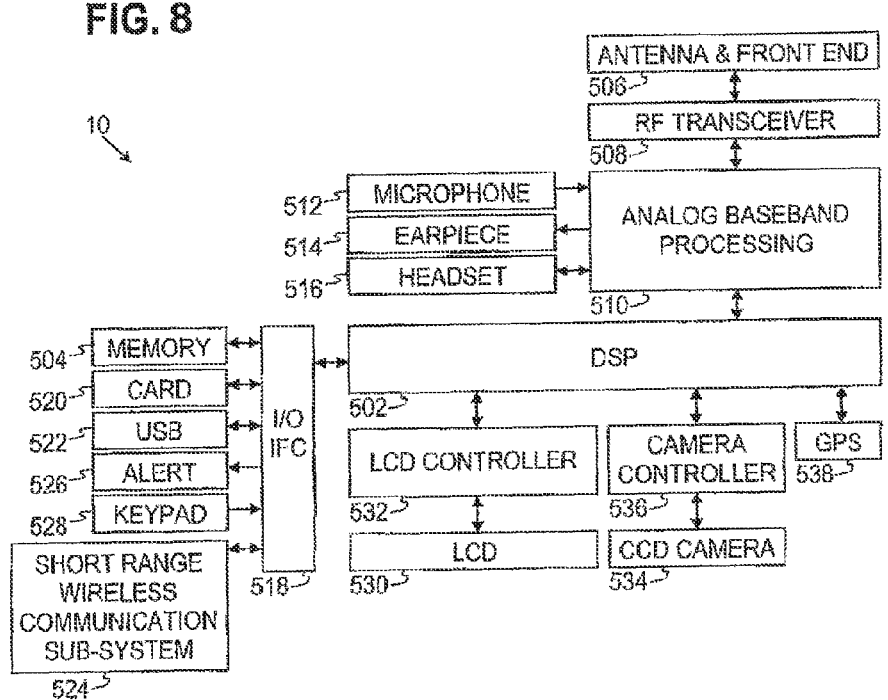
FIG. 8 is a block diagram of a mobile device operable for some of the various embodiments of the disclosure.

FIG. 8 shows a block diagram of the UE 10. While a variety of known components of UEs 10 are depicted, in an embodiment a subset of the listed components and/or additional components not listed may be included in the UE 10. The UE 10 includes a digital signal processor (DSP) 502 and a memory 504. As shown, the UE 10 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UE 10 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UE 10 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 10 to send and receive information from a cellular network or some other available wireless communications network or from a peer UE 10. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UE 10 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 10 and may also enable the UE 10 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 10 to communicate wirelessly with other nearby mobile devices and/or wireless base stations.

The input/output interface 518 may further connect the DSP 502 to the alert 526 that, when triggered, causes the UE 10 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 10. The keyboard 528 may be a full or reduced alphanumeric keyboard such as QWERTY, Dvorak, AZERTY and sequential types, or a traditional numeric keypad with alphabet letters associated with a telephone keypad. The input keys may include a track wheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 10 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UE 10 to determine its position. Various other peripherals may also be included to provide additional functions, e.g., radio and television reception.

Figure 9:
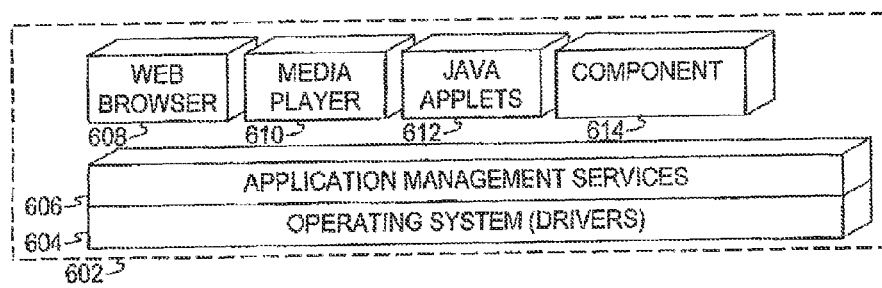
FIG. 9 is a block diagram of a software environment that may be implemented on a mobile device operable for some of the various embodiments of the disclosure.

FIG. 9 illustrates a software environment 602 that may be implemented by the DSP 502. The DSP 502 executes operating system drivers 604 that provide a platform from which the rest of the software operates. The operating system drivers 604 provide drivers for the wireless device hardware with standardized interfaces that are accessible to application software. The operating system drivers 604 include application management services ("AMS") 606 that transfer control between applications running on the UE 10. Also shown in FIG. 9 are a web browser application 608, a media player application 610, and Java applets 612. The web browser application 608 configures the UE 10 to operate as a web browser, allowing a user to enter information into forms and select links to retrieve and view web pages. The media player application 610 configures the UE 10 to retrieve and play audio or audiovisual media. The Java applets 612 configure the UE 10 to provide games, utilities, and other functionality. A component 614 might provide functionality related to the present disclosure.

Figure 10:
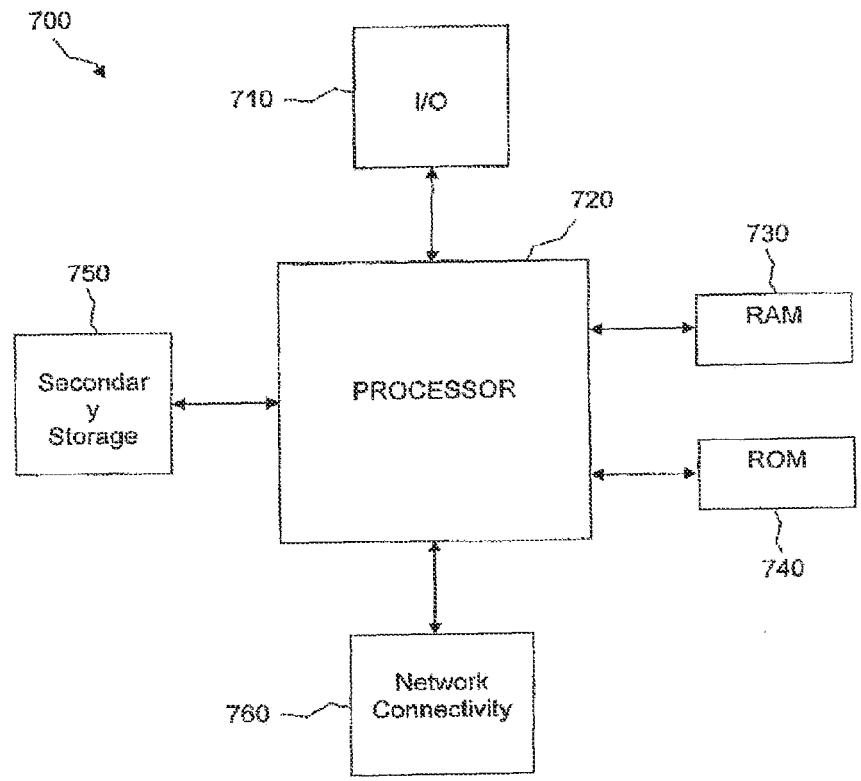
FIG. 10 is a block diagram of an exemplary general purpose computer according to one embodiment of the present disclosure.

The UEs 10, ENBs 20, and central control 110 of FIG. 1 and other components that might be associated with the cells 102 may include any general-purpose computer with sufficient processing power, memory resources, and network throughput capability to handle the necessary workload placed upon it. FIG. 10 illustrates a typical, general-purpose computer system 700 that may be suitable for implementing one or more embodiments disclosed herein. The computer system 700 includes a processor 720 (which may be referred to as a central processor unit or CPU) that is in communication with memory devices including secondary storage 750, read only memory (ROM) 740, random access memory (RAM) 730, input/output (I/O) devices 710, and network connectivity devices 760. The processor may be implemented as one or more CPU chips.

The secondary storage 750 is typically comprised of one or more disk drives or tape drives and is used for non-volatile storage of data and as an over-flow data storage device if RAM 730 is not large enough to hold all working data. Secondary storage 750 may be used to store programs which are loaded into RAM 730 when such programs are selected for execution. The ROM 740 is used to store instructions and perhaps data which are read during program execution. ROM 740 is a non-volatile memory device which typically has a small memory capacity relative to the larger memory capacity of secondary storage. The RAM 730 is used to store volatile data and perhaps to store instructions. Access to both ROM 740 and RAM 730 is typically faster than to secondary storage 750.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 760 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 760 devices may enable the processor 720 to communicate with an Internet or one or more intranets. With such a network connection, it is contemplated that the processor 720 might receive information from the network, or might output information to the network in the course of performing the above-described method steps. Such information, which is often represented as a sequence of instructions to be executed using processor 720, may be received from and outputted to the network, for example, in the form of a computer data signal embodied in a carrier wave.

Such information, which may include data or instructions to be executed using processor 720 for example, may be received from and outputted to the network, for example, in the form of a computer data baseband signal or signal embodied in a carrier wave. The baseband signal or signal embodied in the carrier wave generated by the network connectivity 760 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 720 executes instructions, codes, computer programs, scripts which it accesses from hard disk, floppy disk, optical disk (these various disk-based systems may all be considered secondary storage 750), ROM 740, RAM 730, or the network connectivity devices 760. While only one processor 720 is shown, multiple processors may be present. Thus, while instructions may be discussed as executed by a processor, the instructions may be executed simultaneously, serially, or otherwise executed by one or multiple processors.

RAN1 and RAN2 are standards related to Radio Layer 1 and Radio Layer 2, respectively. Radio Layer 1 generally pertains to, but is not limited to, the physical layer of the radio interface for UE, UTRAN (UMTS Terrestrial Radio Access Network), Evolved UTRAN, and beyond and may cover both frequency divisional duplex (FDD) and time divisional duplex (TDD) modes of radio interface. Radio Layer 2 generally pertains to, but is not limited to, radio interface architecture and protocols such as media access control (MAC), radio link control (RLC) and packet data convergence protocol (PDCP), specification of the Radio Resource Control protocol, and strategies of Radio Resource Management and the services provided by the physical layer to the upper layers).

Several contributions in RAN2 are considering configurations of CQI reports during DRX. The contributions are also considering what should happen to signaling resources when timing alignment is lost on the uplink. These contributions have not taken fully into consideration the role of sounding reference signals (SRS) and scheduling request (SR) and scheduling indicators (SRI).

It has been agreed in RAN1 that SRS periods will be 2, 5, 10, 20, 40, 80, 160, 320 ms. SRS is used in support of CQI and uplink timing estimation by a base station. RAN2 has introduced as a discussion point how to operate CQI while a mobile has been configured for DRX.

In some embodiments, as described above, DRX in Connected Mode will be configured by the eNB. Part of the configuration is the setting of the DRX-cycle "On" Duration, inactivity timers and HARQ timer. During the "On" Duration, UE will monitor the PDCCH or configured resource for the possible downlink transmissions. When a PDCCH is decoded successfully, an inactivity timer will be started. At the end of the active period, UE may go back to sleep according to the configurations.

In some embodiments, a length of long DRX cycle is a determiner in how to allow the UE to move into an unsynchronized state. It is conceivable that a DRX cycle greater than 1 second could lead to loss of UL synchronization. At such a point, all SRS and CQI transmissions on the UL should be terminated and the UE should access the random access channel (RACH) whenever data needs to flow in the UL. In some embodiments, mobility has a direct impact on UL synchronization loss. If the unsynchronized state has not been entered, the SRS transmission must continue as needed. Under modest mobility conditions (e.g. 30 kilometers/hour), the SRS period may be on the order of 50 ms. This is less than several of the shorter DRX cycles. Synchronization is to be maintained if any uplink transmissions are to take place.

In some embodiments, the UE will transmit the SRS during the appropriate "On" Duration. In the "Off" Duration, the UE may not transmit SRS. Furthermore, to simplify the procedure by avoiding frequent reassignment or release, the SRS resource should not be released when the UE is not transmitting the SRS. In some embodiments, the SRS resource is only released when an uplink timing alignment timer expires.

In some embodiments, the UE transmits the SRS during the DRX "On" Duration, and SRS transmissions may be stopped during the off duration. The resource for the SRS is maintained during the DRX and released only when the uplink timing alignment timer has expired.

In some embodiments, as a matter of saving battery power, transmission of SRS and CQI occur in the same sub-frame whenever feasible. Also, in order to maintain the uplink time alignment for different UE's with high velocity, the eNB is enabled to configure the UE for the SRS transmission irrespective of DRX in certain conditions.

In some embodiments, transmission of SRS and CQI is in the same sub-frame whenever feasible to save UE's battery power. To maintain uplink timing alignment, the eNB configures the UE to transmit SRS irrespective of the DRX.

FIG. 5A shows the case when the SRS period is less frequent than CQI. FIG. 5B shows the opposite case. In FIG. 5B the eNB selects an SRS transmission periodicity that is smaller than the DRX cycle. This situation will be more common when the UE moves to the longer DRX cycles. If UL synchronization must be maintained even during the longer DRX cycle, for example 640 ms or more, then the SRS is transmitted.

In some embodiments, methods and devices described herein are for use in long term evolution (LTE) networks. However, the devices and methods described herein are not intended to be limited to only LTE networks. In some embodiments, the methods and devices described herein are for use with other types of communication networks.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method in a user equipment (UE), comprising:
receiving an instruction;
determining from the instruction whether to operate in a first operation mode or a second operation mode;
wherein when operating with discontinuous reception (DRX) in the first operation mode, the UE transmits a sounding reference signal (SRS) during DRX active time; and
wherein when operating with DRX in the second operation mode, the UE transmits a SRS irrespective of DRX active time; and
maintaining an SRS resource configuration for the user equipment when not in the DRX active time.

2. The method of claim 1, wherein the determining comprises operating in the first operation mode when the received instruction includes an instruction to operate in the first operation mode.

3. The method of claim 2, wherein the determining comprises operating in the second operation mode when the received instruction includes an instruction to operate in the second operation mode.

4. The method of claim 3, wherein the UE operates in the second operation mode in the absence of an instruction to operate in the first operation mode.

5. The method of claim 2, wherein the UE operates in the first operation mode in the absence of an instruction to operate in the second operation mode.

6. The method of claim 1, wherein the received instruction is from a network.

7. The method of claim 1, wherein the method is repeated continuously.

8. The method of claim 1, wherein the method executes when there is a change in SRS period.

9. The method of claim 8, wherein the SRS period changes as a function of mobility of the UE.

10. The method claim 1, wherein the method executes when there is a change in DRX cycle.

11. The method of claim 10, wherein the DRX cycle changes as a function of channel utilization.

12. The method of claim 1, wherein when operating with discontinuous reception (DRX) in the first operation mode, the UE refrains from transmitting the sounding reference signal (SRS) when not during DRX active time.

13. A user equipment (UE) for a wireless telecommunications system, comprising:

a receiver, the receiver configured to receive an instruction;
a transmitter, the transmitter configured to transmit a sounding reference signal (SRS); and
a processor, the processor configured to perform operations comprising:
   determining from the received instruction whether to operate in a first operation mode or a second operation mode;
   wherein when operating with discontinuous reception (DRX) in the first operation mode, instructing the transmitter to transmit SRS during DRX active time; and
   wherein when operating with DRX in the second operation mode, instructing the transmitter to transmit SRS irrespective of DRX active time; and
   maintaining an SRS resource configuration for the user equipment when not in the DRX active time.

14. The UE of claim 13, wherein the determining comprises operating in the first operation mode when the received instruction includes an instruction to operate in the first operation mode.

15. The UE of claim 13, wherein the determining comprises operating in the second operation mode when the received instruction includes an instruction to operate in the second operation mode.

16. The UE of claim 13, wherein the UE operates in the second operation mode in the absence of an instruction to operate in the first operation mode.

17. The UE of claim 13, wherein the UE operates in the first operation mode in the absence of an instruction to operate in the second operation mode.

18. The UE of claim 13, wherein the received instruction is from a network.

19. The UE of claim 13, wherein the processor is configured to repeat the operations continuously.

20. The UE of claim 13, wherein the processor is configured to perform the operations when there is a change in SRS period.

21. The UE of claim 20, wherein the SRS period changes as a function of mobility of the UE.

22. The UE of claim 13, wherein the processor is configured to perform the operations when there is a change in DRX cycle.

23. The UE of claim 22, wherein the DRX cycle changes as a function of channel utilization.

24. The UE of claim 13, wherein when operating with discontinuous reception (DRX) in the first operation mode, the UE refrains from transmitting the sounding reference signal (SRS) when not during DRX active time.

25. A non-transitory machine-readable medium with a set of instructions stored thereon, which when executed, cause a processor to perform operations comprising:
   receiving an instruction; determining from the instruction whether to operate in a first operation mode or a second operation mode;
   wherein when operating with discontinuous reception (DRX) in the first operation mode, transmitting a sounding reference signal (SRS) during DRX active time; and
   wherein when operating with DRX in the second operation mode, transmitting a SRS irrespective of DRX active time; and
   maintaining an SRS resource configuration for the user equipment when not in the DRX active time.

26. The medium of claim 25, wherein the determining comprises operating in the first operation mode when the received instruction includes an instruction to operate in the first operation mode.

27. The medium of claim 25, wherein the determining comprises operating in the second operation mode when the received instruction includes an instruction to operate in the second operation mode.

28. The medium of claim 25, the operations further comprising operating in the second operation mode in the absence of an instruction to operate in the first operation mode.

29. The medium of claim 24, the operations further comprising operating in the first operation mode in the absence of an instruction to operate in the second operation mode.

30. The medium of claim 25, wherein the received instruction is from a network.

31. The medium of claim 25, wherein the operation are repeated continuously.

32. The medium of claim 25, wherein the operations are executed when there is a change in SRS period.

33. The medium of claim 32, wherein the SRS period changes as a function of mobility.

34. The medium claim 25, wherein the operations are executed when there is a change in DRX cycle.

35. The medium of claim 34, wherein the DRX cycle changes as a function of channel utilization.

36. The medium of claim 25, wherein when operating with discontinuous reception (DRX) in the first operation mode, the UE refrains from transmitting the sounding reference signal (SRS) when not during DRX active time.

* * * * *

UNITED STATES PATENT AND TRADEMARK OFFICE
CERTIFICATE OF CORRECTION

PATENT NO. : 9,155,045 B2  Page 1 of 1
APPLICATION NO. : 14/522277
DATED : October 6, 2015
INVENTOR(S) : James Earl Womack, Zhijun Cai and Yi Yu It is certified that error appears in the above-identified patent and that said Letters Patent is hereby corrected as shown below:

Claims

In Column 14, Line 40, In Claim 3, delete "claim 2," and insert -- claim 1, --, therefor.

In Column 14, Line 44, In Claim 4, delete "claim 3," and insert -- claim 1, --, therefor.

In Column 14, Line 47, In Claim 5, delete "claim 2," and insert -- claim 1, --, therefor.

In Column 14, Line 58, In Claim 10, after "method" insert -- of --.

In Column 16, Line 28, In Claim 29, delete "claim 24," and insert -- claim 25, --, therefor.

In Column 16, Line 39, In Claim 34, after "method" insert -- of --.

Signed and Sealed this
Twenty-third Day of February, 2016

Michelle K. Lee
*Director of the United States Patent and Trademark Office*